United States Patent Office 2,892,677
Patented June 30, 1959

2,892,677

SEPARATION OF URANIUM FROM THORIUM AND PROTACTINIUM

William Kenneth Rodgerson Musgrave, Durham, England, assignor, by mesne assignments, to the United States of America as represented by the United States Atomic Energy Commission No Drawing. Application November 27, 1946
Serial No. 712,722

8 Claims. (Cl. 23—14.5)

This invention relates to the separation of uranium from thorium and protactinium. A mixture of these elements is obtained, for example, as the result of irradiation by neutrons of so-called thorium carbonate, which is a mixture of thorium oxide and thorium carbonate. The mixture thus obtained has a small amount of uranium, a small amount of protactinium and a comparatively large amount of thorium, the ratio of uranium to thorium being often as low as 1:30,000 or less.

This application is a continuation-in-part of my copending application Serial No. 699,347, filed September 25, 1946, now abandoned.

The method of separating the constituents of such a mixture has been first to convert the mixture to a mixture of soluble salts of its ingredients, which is generally done by heating the mixture with concentrated nitric acid. This step results in the conversion of all three of the elements in question to the form of water-soluble nitrates. The conversion to soluble salts can be effected with other acids, but some of the resultant salts are not as soluble as the nitrates and not as convenient to use. The next step usually is to remove the protactinium by adsorption on manganese dioxide. The uranium is then removed by a solvent extraction using such solvents as ether, methyl isobutyl ketone, etc.

This prior method has a number of disadvantages, one of which is that in order to cause sufficiently large amounts of the uranyl nitrate to pass into the organic solvents it is necessary to add salting out agents. Another disadvantage is that comparatively large amounts of thorium (e.g. 100 parts thorium to 1 part uranium) are extracted with the uranium, so that several cycles are necessary to purify the uranium completely.

According to the present invention these disadvantages of the prior method are overcome by adding to the mixture of soluble salts referred to above an organic salt of the formula:

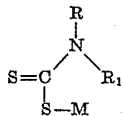

wherein R is alkyl, $R_1$ is alkyl or aryl and M is an alkali metal or an alkaline earth metal. Such an organic salt reacts with uranyl nitrate to give the corresponding organic uranyl salt but does not react with the protactinium or thorium nitrate. The organic uranyl salt can then be extracted by the use of any organic solvent in which it is soluble.

The following detailed description shows, by way of example, a suitable way of carrying out the invention into practice. As the preferred organic salt of the type referred to above is sodium diethyldithiocarbamate, this description will be based on the use of this preferred salt.

In carrying out the invention a solution of nitrates of the three metals in the mixture, namely uranium, thorium and protactinium, is made in the usual way. The protactinium can then be removed in the ordinary way by adsorption on manganese dioxide, but it may on the other hand be left in the solution. If it is removed, a certain amount of manganese nitrate is formed from the manganese dioxide in the solution and this nitrate reacts with the sodium diethyldithiocarbamate to give manganese diethyldithiocarbamate, which must subsequently be separated from the uranium.

Whether or not the protactinium has been removed, the solution is brought to a pH of between 2 and 3, for example by the addition of ammonia. The sodium diethyldithiocarbamate is then dissolved in a solvent in which the subsequently formed uranyl diethyldithiocarbamate is also soluble. Such a solvent is, for example, amyl acetate or methyl isobutyl ketone, the former being preferable for the reasons which will be indicated below. The sodium diethyldithiocarbamate is dissolved in amyl acetate to form a solution containing 0.25% of the former, and this solution is then shaken up with the solution of mixed nitrates, the organic solution and aqueous solution being, for example, of equal volumes. As soon as the organic solution is added to the aqueous solution an orange colour develops, indicating the formation of uranyl diethyldithiocarbamate. On the separation of the organic solution from the aqueous solution, the former is found to contain a substantial amount of uranyl diethyldithiocarbamate with no thorium and less than 1 part protactinium in 2000. Instead of sodium diethyldithiocarbamate, other dialkyl- or alkaryldithiocarbamates have been used with success, for example sodium dibutyldithiocarbamate and sodium methylphenyldithiocarbamate.

Examples of other dithiocarbamates which can be used are potassium dibutyldithiocarbamate, lithium ethylphenyldithiocarbamate, calcium diethyldithiocarbamate, barium methylphenyldithiocarbamate and strontiumdiethyldithiocarbamate.

The advantage of using amyl acetate as the solvent is that in that case no thorium is extracted, whereas the use of certain other solvents for both sodium and uranyl diethyldithiocarbamate, for example methyl isobutyl ketone, will result in the extraction of as much as 1 part or more of thorium for each part uranium. However, since methyl isobutyl ketone and other solvents such as diethyl ketone, methyl-N-propyl ketone and dibutoxytetraethyleneglycol, extract the uranyl diethyldithiocarbamate more efficiently than amyl acetate, they may in certain cases be preferred, in spite of the fact that they will extract more thorium.

The organic solvent in which the uranyl diethyldithiocarbamate is dissolved can be treated by a variety of procedures to recover the uranium therefrom. These procedures form no part of the present invention but a suitable one is, for example, to evaporate the solvent and heat the residue strongly until all the organic material has been destroyed, thus leaving the uranium as oxide. This oxide may be dissolved in acid, and any thorium present precipitated from the solution as a fluoride, thus leaving a pure uranium salt.

What I claim is:

1. The method of separating uranium from thorium, which comprises dissolving a mixture containing uranium and thorium or compounds thereof with a liquid containing an acid reagent to convert said mixture to a solution of a mixture of soluble salts of uranium and thorium, bringing the solution to a pH of between 2 and 3, and adding to the solution an organic salt of the formula

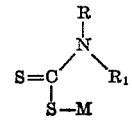

wherein R is alkyl, $R_1$ is alkyl or aryl and M is an alkali metal or an alkaline earth metal.

2. The method according to claim 1, in which the organic salt is a sodium salt.

3. The method according to claim 1, in which the organic salt is sodium diethyldithiocarbamate.

4. The method according to claim 1, in which the organic salt is added dissolved in a solvent for it and for the compound formed by reaction between it and the soluble salt of uranium.

5. The method according to claim 1, in which the organic salt is added dissolved in amyl acetate.

6. The method according to claim 1, in which the acid reagent is nitric acid and the soluble salts of uranium and thorium are nitrates.

7. The method according to claim 6, in which the organic salt is added dissolved in a solvent for it and for the compound formed by reaction between it and uranyl nitrate.

8. The method according to claim 6, in which the organic salt is sodium diethyldithiocarbamate.

References Cited in the file of this patent

Delepine: "Bull. Soc. Chim. France," 4th Series, vol. 3, pages 641–652 (1908).